United States Patent
Watanabe

(10) Patent No.: US 7,438,989 B2
(45) Date of Patent: Oct. 21, 2008

(54) FLAT CELL, BATTERY, COMBINED BATTERY, AND VEHICLE

(75) Inventor: Kyouichi Watanabe, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 736 days.

(21) Appl. No.: 10/944,708

(22) Filed: Sep. 21, 2004

(65) Prior Publication Data

US 2005/0079757 A1 Apr. 14, 2005

(30) Foreign Application Priority Data

Oct. 10, 2003 (JP) .............................. 2003-352748

(51) Int. Cl.
*H01M 2/02* (2006.01)
*H01M 2/10* (2006.01)
*H01M 2/20* (2006.01)

(52) U.S. Cl. .................. 429/163; 429/133; 429/179

(58) Field of Classification Search ............. 429/100, 429/133, 158, 159, 163, 179
See application file for complete search history.

(56) References Cited

U.S. PATENT DOCUMENTS

| 2003/0049527 A1 | 3/2003 | Yageta et al. | |
| 2003/0124419 A1* | 7/2003 | Ito et al. | 429/158 |
| 2003/0170535 A1* | 9/2003 | Watanabe et al. | 429/158 |
| 2003/0190522 A1* | 10/2003 | Ogata | 429/179 |

FOREIGN PATENT DOCUMENTS

| CN | 1426121 | 6/2003 |
| JP | 2002-510124 A | 7/2002 |
| JP | 2003-288883 A | 10/2003 |
| KR | 2001-047031 | 6/2001 |

* cited by examiner

*Primary Examiner*—Gregg Cantelmo
(74) *Attorney, Agent, or Firm*—Foley & Lardner LLP

(57) ABSTRACT

A flat cell of the present invention has: a power-generating element which includes a positive plate, a negative plate, and a separator provided between the positive and negative plates; a sheath member which is composed of a upper sheath member and a lower sheath member and accommodates the power-generating element; and positive and negative terminals connected to the power-generating element through a plurality of collectors and extended from a outer periphery of the sheath member. The upper sheath member includes a flat wall in a portion accommodating the power-generating element and an inclined wall between the flat wall and the outer periphery of the sheath member. When the inside of the cell is evacuated, the inclined wall is curved toward the inside of the cell.

28 Claims, 10 Drawing Sheets

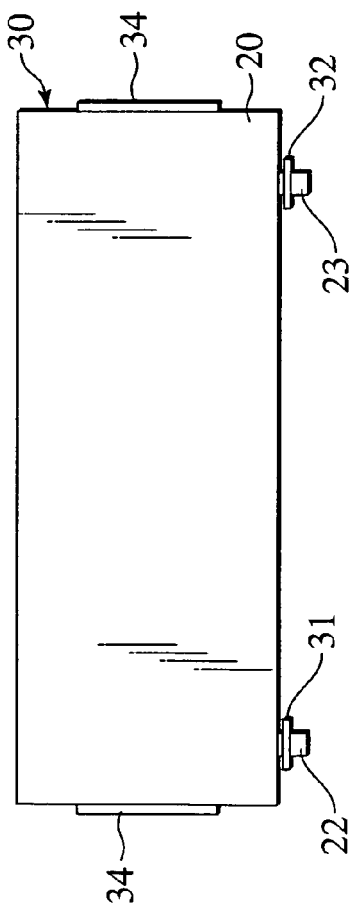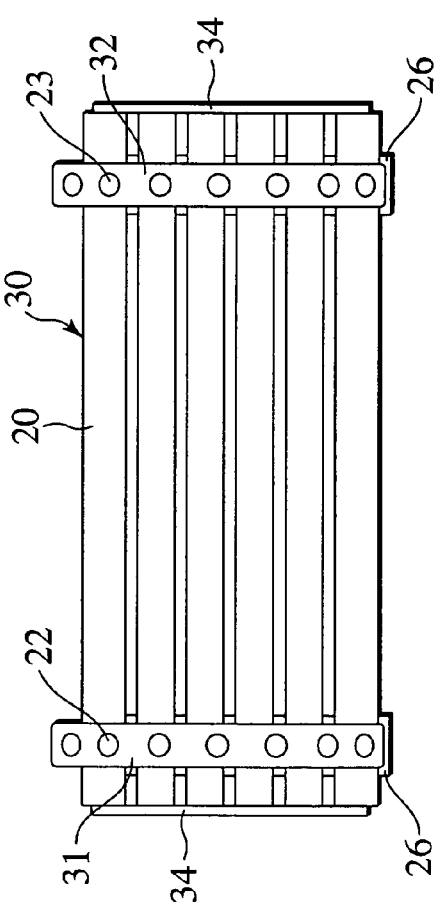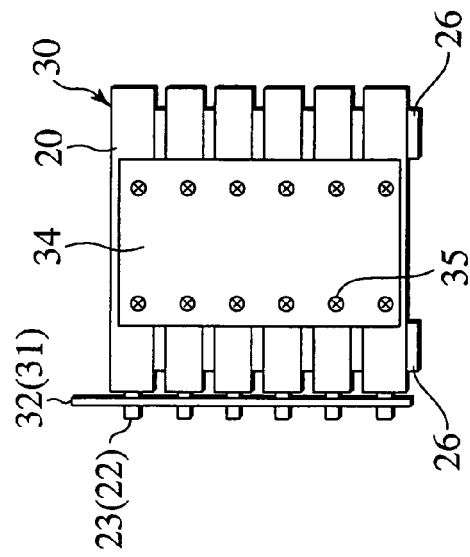

FLAT CELL, BATTERY, COMBINED BATTERY, AND VEHICLE

BACKGROUND OF THE INVENTION

1. Field of the Invention

The present invention relates to a flat cell in which a power-generating element is sealed with a sheath member and electrode terminals connected to the power-generating element through a plurality of collectors are extended out from the outer periphery of the sheath member. Herein, the power-generating element includes positive and negative plates alternately stacked with separators interposed therebetween.

2. Description of the Related Art

In a general flat cell including a laminated material made of resin-metal thin film as the sheath member, the sheath member is formed by just heat-sealing sheets of the laminated material at the outer periphery thereof without previously molding the laminated material (see Publication of a Japanese Translation of an PCT International Application No. 2002-510124).

SUMMARY OF THE INVENTION

However, in such a flat cell, surface pressure is strong in the outer periphery of the power-generating element sealed with the sheath member and becomes weaker toward the center portion thereof. The distribution of the surface pressure in the power-generating element tends to be uneven as a whole.

This uneven distribution of the surface pressure leads to a tendency for intervals between the electrode plates to be small in the outer periphery of the power-generating element and widened toward the center thereof. In the entire flat cell, the intervals between the electrode plates are varied.

In such a flat cell with intervals between the electrode plates varied as a whole, the distribution of degradation of an electrode active material caused by charge transfer is varied. The foregoing tendency is strong in a laminate-type flat cell, whose electrodes are not wound. Especially in a flat cell including electrode plates with large surfaces, which is used in a vehicle, the degradation distribution is highly likely to be varied.

In a method for equalizing the surface pressure of the flat cell, as shown in FIG. 1A, a sheath member 206 is a molded piece with a simple convex shape. In the sheath member 206, a flat wall 210 is previously molded in a portion accommodating the power-generating element 208, and vertical walls 214 are previously molded between the flat wall 210 and a thermal welded portion 209. However, when a cell 200 is evacuated to vacuum, as shown in FIG. 1B, wrinkle is caused in the vertical walls 214 of the sheath member 206, thus leading to the possibility of reduced strength of the sheath member.

An object of the present invention is to provide a flat cell capable of equalizing the distribution of degradation of electrode active materials and maintaining the strength of the sheath member.

The first aspect of the present invention provides a flat cell comprising: a power-generating element which includes a positive plate, a negative plate, and a separator provided between the positive and negative plates; a sheath member which is composed of a upper sheath member and a lower sheath member and accommodates the power-generating element, the upper sheath member including a flat wall in a portion accommodating the power-generating element and an inclined wall between the flat wall and the outer periphery of the sheath member; and positive and negative terminals connected to the power-generating element through a plurality of collectors and extended from a outer periphery of the sheath member, wherein when the inside of the cell is evacuated, the inclined wall is curved toward the inside of the cell.

The second aspect of the present invention provides a battery comprising: a plurality of flat cells, each of the flat cells comprising: a power-generating element which includes a positive plate, a negative plate, and a separator provided between the positive and negative plates; a sheath member which is composed of a upper sheath member and a lower sheath member and accommodates the power-generating element, the upper sheath member including a flat wall in a portion accommodating the power-generating element and an inclined wall between the flat wall and the outer periphery of the sheath member; and positive and negative terminals connected to the power-generating element through a plurality of collectors and extended from a outer periphery of the sheath member, wherein when the inside of the cell is evacuated, the inclined wall is curved toward the inside of the cell.

BRIEF DESCRIPTION OF THE DRAWINGS

The invention will now be described with reference to the accompanying drawings wherein;

FIG. 11A is a plan view showing a combined battery composed of a plurality of the batteries according to the present invention;

FIG. 11B is a front view showing the combined battery composed of the plurality of batteries according to the present invention;

FIG. 11C is a side view showing the combined battery composed of the plurality of batteries according to the present invention.

DETAILED DESCRIPTION OF THE PREFERRED EMBODIMENTS

Figure 1A:
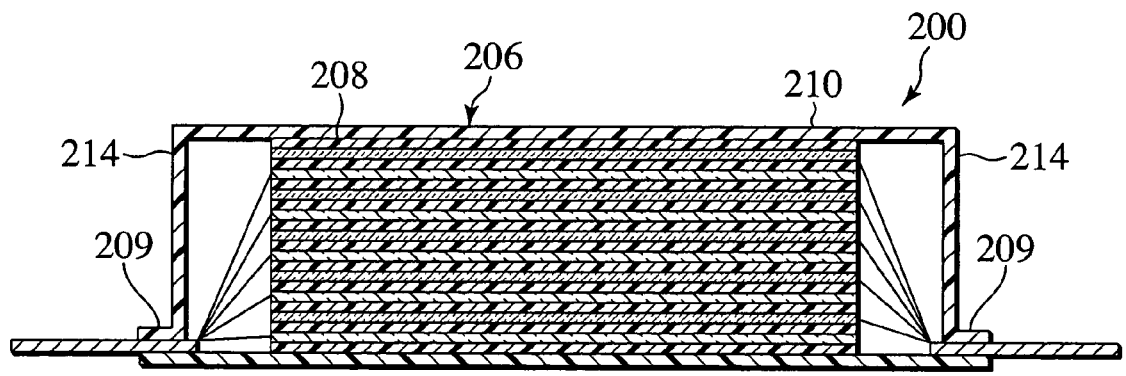
FIG. 1A is a cross-sectional view showing a conventional flat cell with an upper sheath member molded into a convex before the cell is evacuated.
Figure 1B:
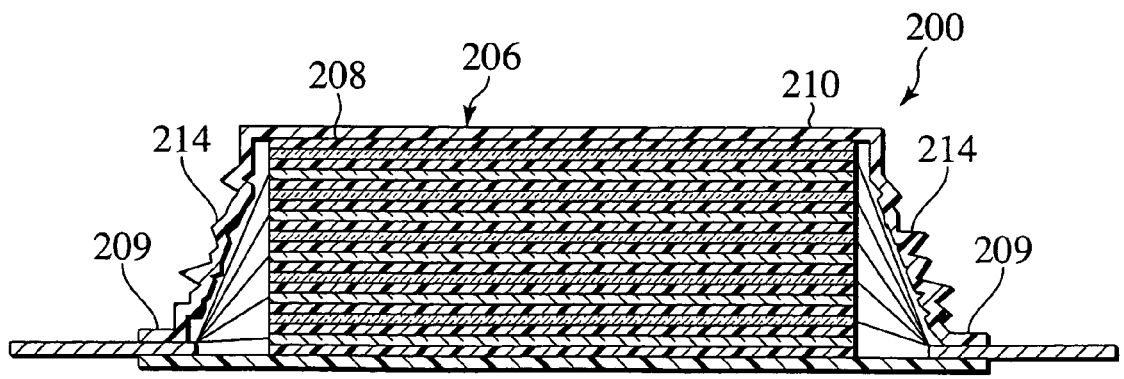
FIG. 1B is a cross-sectional view showing the conventional flat cell with the upper sheath member molded into a convex after the cell is evacuated.
Figure 2:
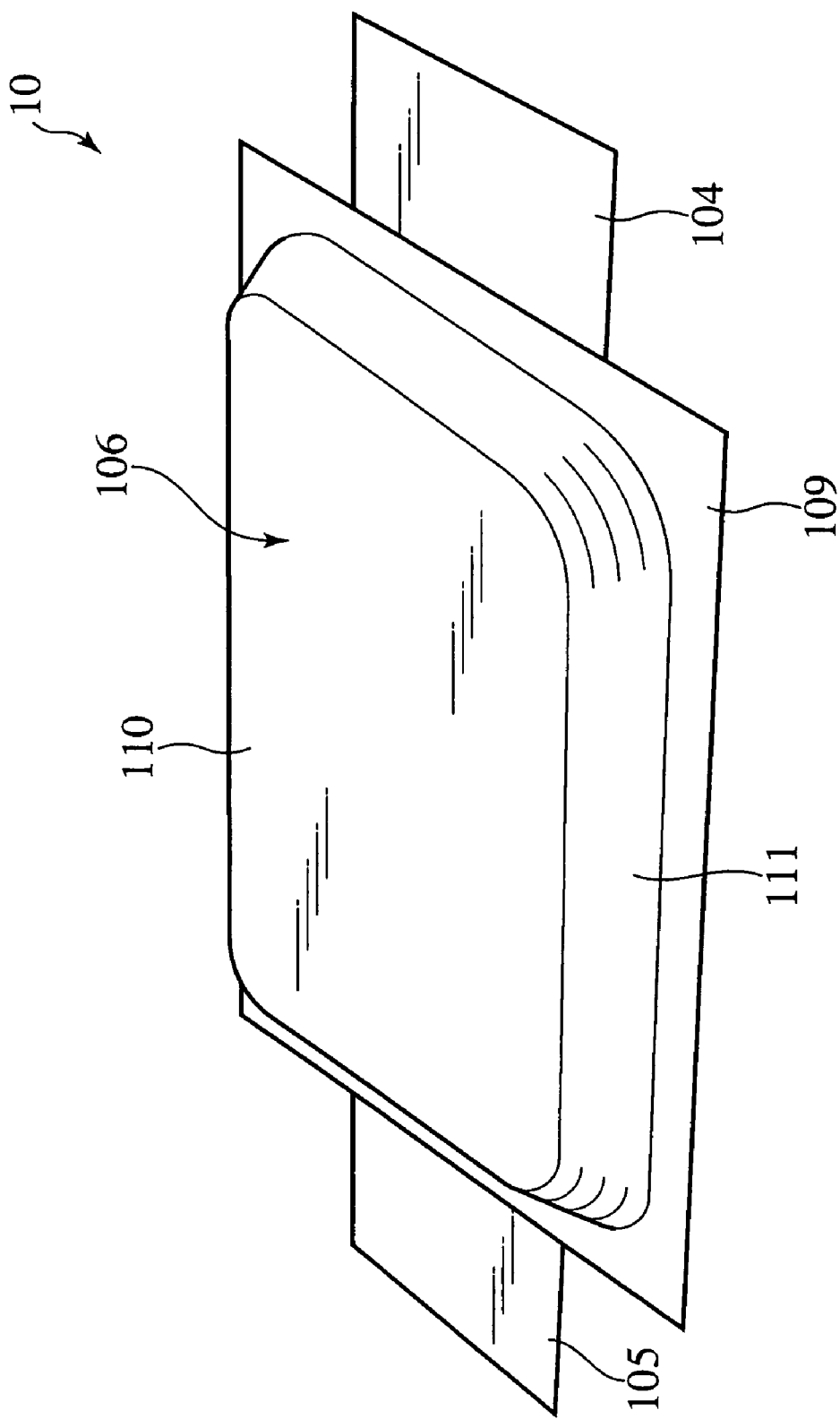
FIG. 2 is a perspective view of a flat cell according to a first embodiment of the present invention.

Hereinafter, description will be made of embodiments of the present invention with reference to the drawings.

With reference to FIG. 2 and FIGS. 3A to 3C, a description is given of the entire construction of a flat cell 10 according to a first embodiment of the present invention. The flat cell 10 is a lithium-based thin type secondary cell and includes five positive plates 101, eleven separators 102, five negative plates 103, a positive terminal 104, a negative terminal 105, an upper sheath member 106, a lower sheath member 107, and an electrolyte not shown in particular. The positive plates 101, the separators 102, and the negative plates 103 among those are referred to as a power-generating element.

The numbers of positive plates 101, separators 102, and negative plates 103 are not limited to the aforementioned numbers in the present invention, and the power-generating element 108 can be composed of one positive plate 101, three separators 102, and one negative plate 103. The numbers of positive plates 101, separators 102, and negative plates 103 can be selected depending on the need.

The positive plates 101 constituting the power-generating element 108 are fabricated as follows. First, a positive electrode active material such as metal oxide, a conductive material such as carbon black, and an binder such as aqueous dispersion of polytetrafluoroethylene are mixed, for example, in a ratio of 100/3/10 by weight. This mixture is coated on each surface of an aluminum foil or the like as a positive side collector and dried. Thus, obtained sheet is rolled and cut to a predetermined size, thus obtaining the positive plates 101. The above ratio of aqueous dispersion of polytetrafluoroethylene mixed is determined on a basis of the solid contents thereof.

The positive electrode active material can be lithium-based composite oxide such as lithium nickelate ($LiNiO_2$), lithium manganate ($LiMnO_2$), or lithium cobaltate ($LiCoO_2$), lithium chalcogenide ($Li_2S$, $Li_2Se$, and $Li_2Te$), or the like. These materials comparatively easily release heat generated within the flat cell and can control stresses for the sheath members 106 and 107 to be a comparatively small, thus preventing wrinkle in step portions 111 of the upper sheath member 106.

The negative plates 103 constituting the power-generating element 108 are fabricated as follows. A negative electrode active material carrying out absorption and desorption of lithium ions, such as amorphous carbon, hard carbon, soft carbon, and graphite, is mixed with aqueous dispersion of styrene-butadiene rubber powder as a precursor material of a burned organic substance, for example, in a solid content ratio of 100/5. The mixture is then dried and crushed to obtain carbon particles with carbonized styrene-butadiene rubber supported on surfaces thereof as a main material of the negative plate 103. Then obtained particles are mixed with a binder such as acrylic resin emulsion, for example, in a ratio of 100/5 by weight. Subsequently, the mixture is coated on each surface of a metallic foil such as a nickel or copper foil as a negative side collector and then dried. The obtained sheet is rolled and cut to a predetermined size, thus obtaining the negative plates 103.

Using amorphous carbon or hard carbon for the negative electrode active material, the potential in charge and discharge has poor flatness, and the output voltage is lowered along with discharge. Therefore, a cell using amorphous carbon or hard carbon for the negative electrode active material is unsuitable for a power supply of communication equipment or office equipment. However, such a cell is advantageous when used as a power supply of an electrical vehicle or the like since the output voltage does not drastically drop.

The separators 102 of the power-generating element 108 prevent short circuits between the aforementioned positive plates 101 and negative plates 103. The separators 102 may include a function of holding an electrolyte. Moreover, each of the separators 102 is a porous film composed of polyolefin such as polyethylene (PE) or polypropylene (PP) and the like. When an excess current flows through the separators 102, pores of the separators are closed due to heat generation, and the current is thereby cut off.

The separators 102 of the present invention are not limited to a monolayer film of polyolefin or the like and can also employ a three-layer structure made of a polypropylene film sandwiched by polyethylene films and a stacked material made of a polyolefin porous film and organic non-woven fabric or the like. Using a multi-layer substance for the separators 102, it is possible to give the separators 102 various functions such as functions of preventing excess currents, holding an electrolyte, and maintaining the shape of the separators (increasing the rigidity). In addition, a gel electrolyte, an in all solid polymer electrolyte, or the like can be used instead of the separators 102.

In the aforementioned power-generating element 108, the positive plates 101, the separators 102, and the negative plates 103 are sequentially laminated so that the positive plates 101 and the negative plates 103 are alternately laminated and the separators 102 are positioned between the positive plates 101 and the negative plates 103. In addition, a separator 102 is laminated in each of the uppermost part and the lowermost part of the power-generating element 108. Each of the five positive plates 101 is connected to the positive terminal 104 made of a metallic foil through a positive side collector 104a, and each of the five negative plates 103 is connected to the negative terminal 105 also made of a metallic foil through a negative side collector 105a.

The materials of the positive terminal 104 and the negative terminal 105 are not particularly limited as long as the materials are electrochemically stable metallic materials. The material of the positive terminal 104 can be aluminum, aluminum alloy, copper, nickel, or the like. The material of the negative terminal 105 can be nickel, copper, stainless steel, iron, or the like. These metals are suitable particularly for a component of the flat cell in terms of resistance, linear expansion coefficient, and specific resistance of the metals. In addition, even when operating temperature is varied, these metals can control stresses for the sheath members 106 and 107 to be comparatively small and can prevent wrinkle in the step portions 111 of the sheath member 106. Herein, either the positive or negative side collectors 104a and 105a in this embodiment are formed by extended portions of aluminum foils, nickel foils, copper foils, and iron foils constituting the collectors of the positive and negative plates 101 and 103, but the collectors 104a and 105a can be composed of separate materials or parts.

The power-generating element 108 is sealed with the upper and lower sheath members 106 and 107. Each of the upper and lower sheath members 106 and 107 in this embodiment has a three-layer structure including an inner layer, an intermediate layer, and an outer layer from the side of the positive terminal 104 toward the outside of the flat cell 10. The inner layer is composed of a resin film having excellent electrolyte tolerance and heat sealing properties, such as polyethylene, modified polyethylene, polypropylene, modified polypropylene, and ionomer. The intermediate layer is composed of a metal foil of aluminum or the like. The outer layer is composed of a resin film having excellent electrical insulating properties such as polyamide series resin or polyester series resin. Therefore, either of the upper and lower sheath members 106 and 107 is formed of a flexible material such as a laminate material of resin-metal thin film. The laminate material of resin-metal thin film is prepared by laminating a surface (the inner surface of the flat cell 10) of the metal foil such as an aluminum foil with resin such as polyethylene, modified polyethylene, polypropylene, modified polypropylene, or ionomer and laminating another surface thereof (the outer surface of the flat cell 10) with polyamide series resin, polyester series resin, or the like.

As described above, each sheath member is provided with the metal layer in addition to the resin layers. The strength of the sheath member itself can be thereby increased. Furthermore, the sheath members are composed of resin such as polypropylene, modified polypropylene, polyethylene, modified polyethylene, or ionomer. It is then possible to secure good sealing properties between the metallic terminals and the sheath members. Moreover, the drawability of the resin can prevent wrinkle of the step portions.

As shown in FIG. 2 and FIGS. 3A to 3C, the positive terminal 104 extends out from an edge of the sealed sheath members 106 and 107, and the negative terminal 105 extends out from the other edge thereof. Accordingly, spaces equal to the thickness of the positive and negative terminals 104 and 105 are created in a sealing portion 109, in which the upper and lower sheath members 106 and 107 are sealed. In order to maintain air-tightness within the flat cell 10, sheet films composed of polyethylene, polypropylene, or the like can be interposed in portions where the positive and negative terminals 104 and 105 come into contact with the sheath members 106 and 107 by heat sealing or the like. In either of the positive and negative terminals 104 and 105, the sheet film is desirably composed of resin of the same type as that included in the sheath members 106 and 107 in the light of heat sealing properties.

Figure 4:
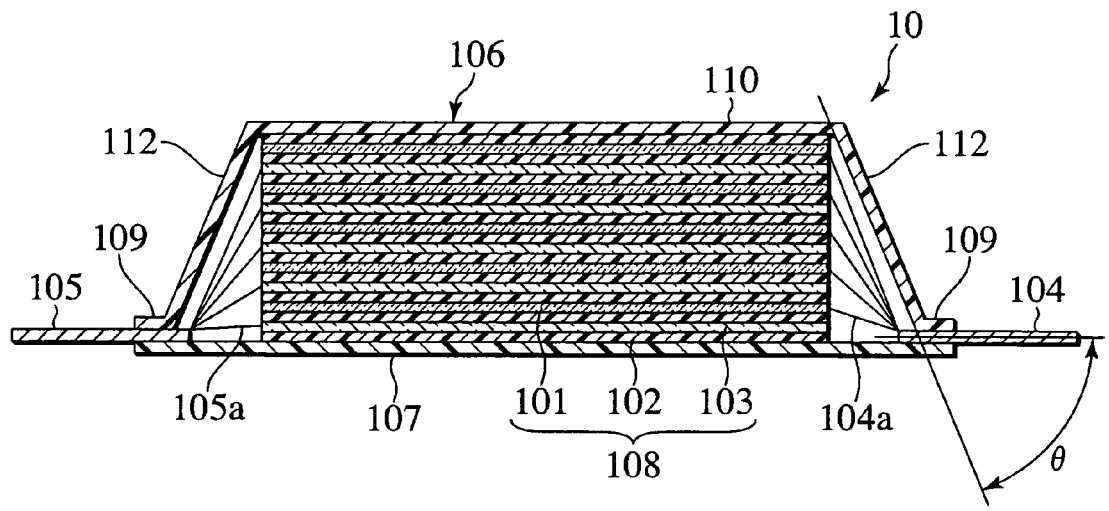
FIG. 4 is a cross-sectional view of the flat cell before the cell is evacuated, taken along a line IIIB-IIIB.

The upper sheath member 106 in this embodiment, as shown in FIG. 4, is a molded piece including a flat wall 110 and inclined walls 112 previously molded by means of press molding or the like. The flat wall 110 is formed in a portion accommodating the power-generating element 108 so as to be substantially flat. The inclined walls 112 are formed to be planar between the flat wall 110 and the sealing portion 109 along the outer periphery.

As shown in FIG. 4, each of the inclined walls 112 is inclined at an angle θ of 45° to 80° with respect to a plane where the positive and negative terminals 104 and 105 extend. In FIG. 4, the angle θ is indicated with a vertically opposite angle.

In the embodiment, as shown in FIG. 4, especially, the inclined wall 112 molded on the side where the positive terminal 104 extends out is substantially parallel to the positive side collector 104a which is positioned closest to the upper sheath member 106 among the positive side collectors 104a. The inclined wall 112 molded on the side where the negative terminal 105 extends out is also substantially parallel to the negative side collector 105a which is positioned closest to the upper sheath member 106 among the negative side collectors 105a.

The angle θ of each inclined wall in the present invention can be set to any angle in a range of 45° to 80°. As this angle increases, the surface pressure distribution becomes more uniform as shown in later-described examples, and, furthermore, the volume of the flat cell can be reduced.

The aforementioned power-generating element 108, the positive side collectors 104a, part of the positive terminal 104, the negative side collectors 105a, and part of the negative terminal 105 are covered with these sheath members 106 and 107. Electrolysis solution containing an electrolyte such as lithium perchlorate or lithium borofluoride in an organic solvent is then injected into space defined by the sheath members 106 and 107. After the inside of the upper and lower sheath members 106 and 107 is evacuated to vacuum, the sealing portion 109 in the outer periphery of the sheath members 106 and 107 is heat-sealed by heat pressing.

The organic solvent can be ester series solvent such as propylene carbonate (PC), ethylene carbonate (EC), and dimethyl carbonate (DMC). However, the organic solvent of the present invention is not limited to these, and it is possible to use organic solvent prepared by mixing ester series solvent with ether series solvent such as γ-butyrolactone (γ-BL) and diethoxyethane (DEE).

Figure 3A:
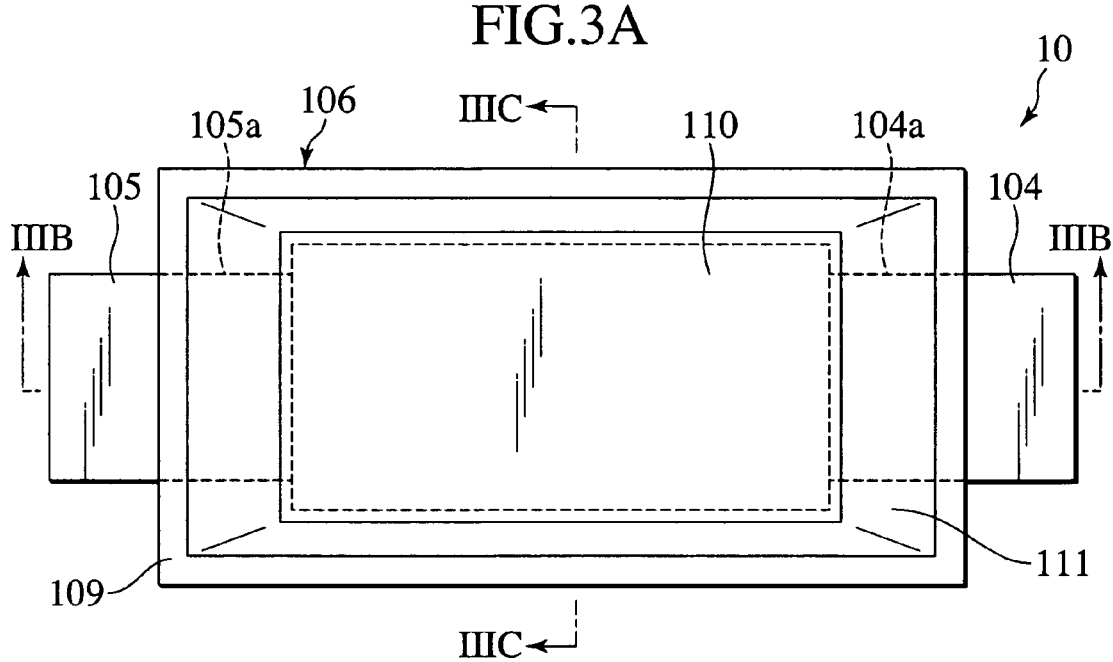
FIG. 3A is a plan view of the flat cell shown in FIG. 2.
Figure 3B:
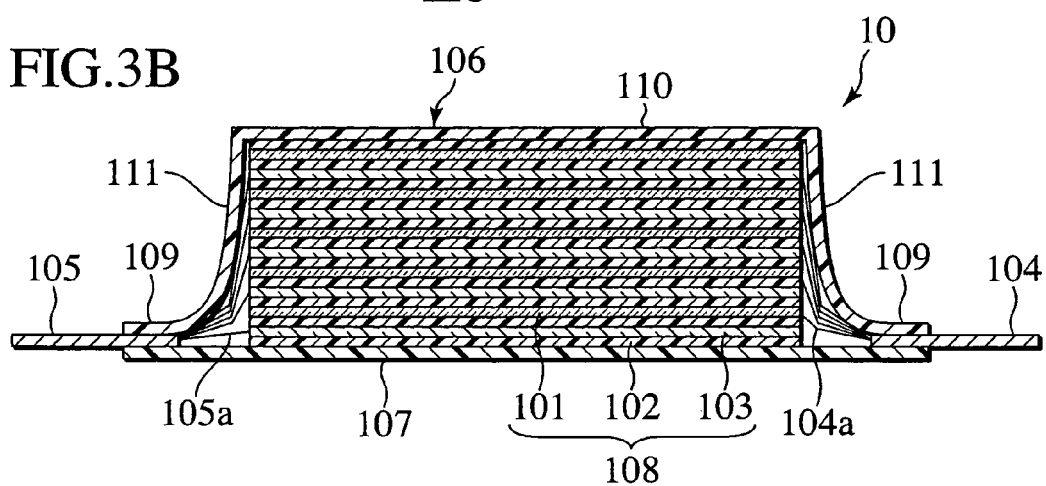
FIG. 3B is a cross-sectional view taken along a line IIIB-IIIB of FIG. 3A.
Figure 3C:
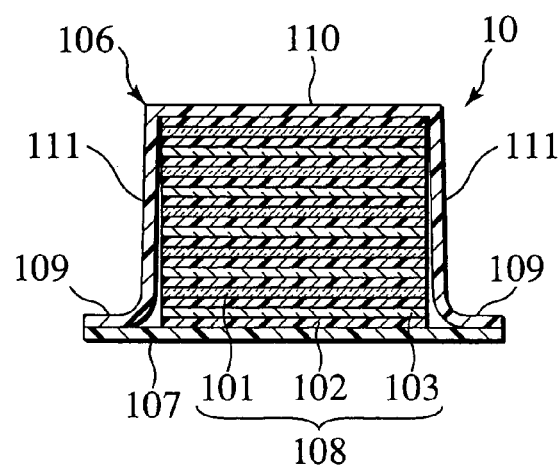
FIG. 3C is a cross-sectional view taken along a line IIIC-IIIC of FIG. 3A.

In the thus constructed flat cell 10 according to this embodiment, first, when the cell 10 is evacuated, the positive and negative plates 101 and 103 are uniformly pressurized through the wide flat wall 110 previously molded in the upper sheath member 106. Therefore, it is possible to eliminate variation in degradation distribution of the positive and negative electrode active materials, which depends on the surface pressure, to equalize the degradation distribution. Moreover, when the cell 10 is evacuated, the inclined walls 112 previously molded in the upper sheath member 106 are, as shown in FIG. 3B, curved toward the inside of the cell 10 so as to follow the collectors 104a and 105a, thus forming the smooth step portions 111 of the upper sheath member 106 and having a substantially circular arc shape. Therefore, wrinkle of the step portions 111 is suppressed, and the strength of the sheath members 106 and 107 can be maintained.

Figure 5:
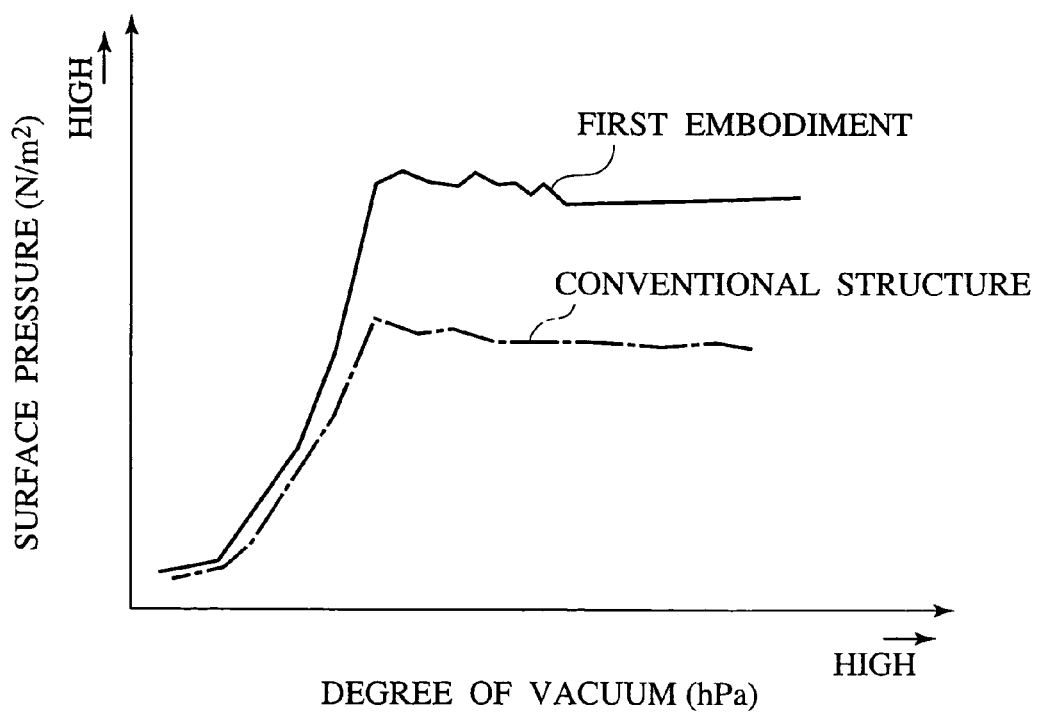
FIG. 5 is a surface pressure-vacuum graph of the flat cell in the first embodiment.

In the flat cell 10 according to the embodiment, as shown in FIG. 5, along with equalization of the surface pressure distribution due to the flat wall 110, the surface pressure applied to the entire power-generating element 108 is increased. The increased surface pressure reduces intervals between the positive and negative plates 101 and 103 overall and lowers the impedance. The capacity originally provided with the flat cell 10 can be sufficiently exerted. The conventional structure in FIG. 5 is the flat cell with the upper sheath member molded in a convex shape shown in FIG. 1A.

The total thickness of the flat cell 10 sealed as described above is preferably within a range from 1 to 10 mm. When the thickness of the flat cell is not more than 10 mm, heat is more likely to be released from the inside of the flat cell. Therefore, stresses to the sheath member can be controlled to be comparatively small, and wrinkle in the step portions can be suppressed, while the thermal degradation is reduced with the cell. The flat cell with a thickness of not less than 1 mm can secure a sufficient capacity and increase in economical efficiency.

Next, a description is given of a second embodiment of the flat cell of the present invention.

Figure 6:
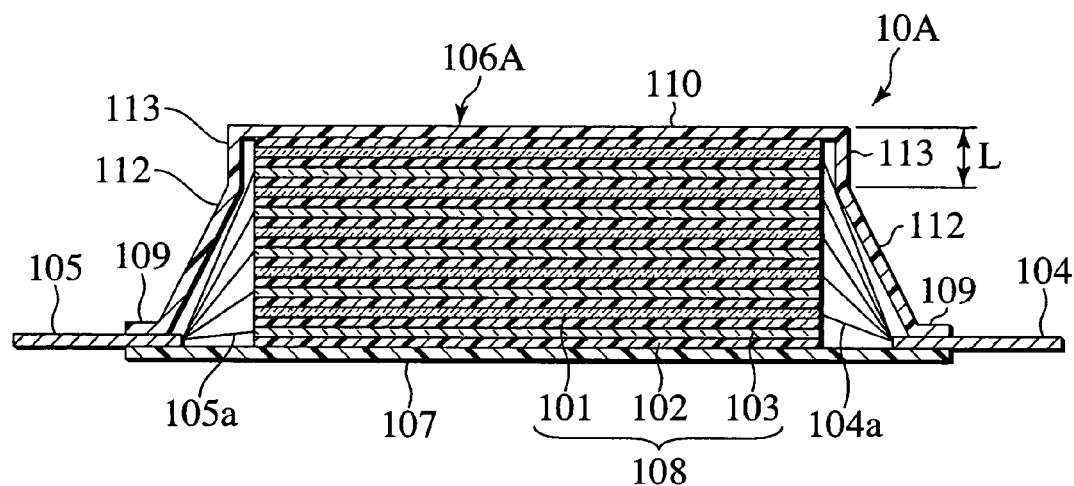
FIG. 6 is a cross-sectional view of a flat cell according to a second embodiment of the present invention before the cell is evacuated, taken along a line IIIB-IIIB of FIG. 3A.

As shown in FIG. 6, as a flat cell 10A according to the second embodiment of the present invention, corner portions 113 may be further molded in the upper sheath member 106 of the flat cell 10.

As shown in FIG. 6, an upper sheath member 106A of the flat cell 10A according to the second embodiment, similarly to the first embodiment, includes the flat wall 110 and the inclined walls 112 previously molded. In the upper sheath member 106A of the flat cell 10A according to the embodiment, the corner portions 113 are respectively formed at positions corresponding to four upper corners of the power-generating element 108.

As shown in FIG. 6, each of the corner portions 113 is molded between the flat wall 110 and each inclined wall 112 of the upper sheath member 106A and includes a vertical part with a length L. The vertical part is substantially vertical to the flat wall 110. The length L of the vertical part of each corner portion 113 in the embodiment is, as shown in FIG. 6, substantially equal to the total of thicknesses of one positive plate 101, three separators 102, and one negative plate 103, which are laminated in the upper part of the power-generating element 108. The length L of the vertical part of each corner portion 113 in the present invention is not particularly limited as long as the length L is longer than a basic unit of the power-generating element, which is the total of thicknesses of a positive plate, a separator, and a negative plate. As the length L of each vertical part is increased, the effect thereof is increased. However, it is preferable that vertical parts of each corner portion have such a length that the inclined walls do not come into contact with the collectors.

When this flat cell 10A is evacuated, similarly to the first embodiment, the positive and negative plates 101 and 103 are uniformly pressurized through the wide flat wall 110 previously molded in the upper sheath member 106A. Moreover, the smooth step portions 111 of the upper sheath member 106A are formed due to the inclined walls 112 previously molded in the upper sheath member 106A, and the inclined walls 112 have a substantially circular arc shape. Therefore, the degradation distributions of the positive and negative plates 101 and 103 are equalized, and the strength of the sheath members 106A and 107 can be maintained.

Furthermore, in the flat cell 10A according to the embodiment, the vertical parts of the corner portions 113 previously molded in the upper sheath member 106A reduce pressure applied to the outer periphery of the power-generating member 108 from the upper sheath member 106A, and the surface pressure applied to the power-generating element 108 is further equalized.

Next, a description is given of a third embodiment of the flat cell of the present invention.

Figure 7:
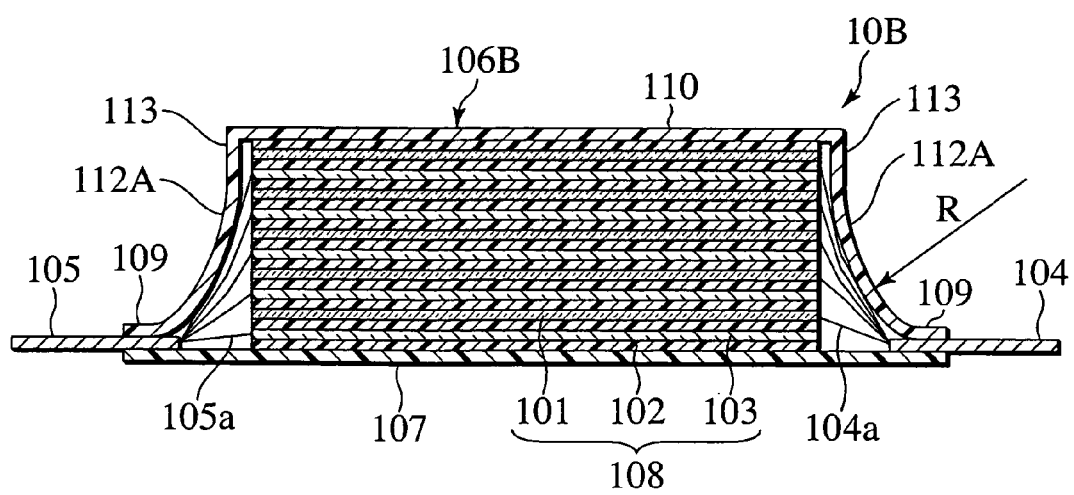
FIG. 7 is a cross-sectional view of a flat cell according to a third embodiment of the present invention before the cell is evacuated, taken along a line IIIB-IIIB of FIG. 3A.

As a flat cell 10B according to the third embodiment of the present invention, as shown in FIG. 7, the corner portions 113 are molded in an upper sheath member 106B of the flat cell 10B, and each of inclined walls 112A is molded into a curved shape.

As shown in FIG. 7, in the upper sheath member 106B of the flat cell 10B according to the third embodiment, similarly to the flat cell 10A according to the second embodiment, the flat wall 110, the inclined walls 112A, and the corner portions 113 between the flat wall 110 and the inclined walls 112A are previously molded. Furthermore, in the flat cell 10B according to this embodiment, each of the inclined walls 112A of the upper sheath member 106B is molded into a curved shape.

As shown in FIG. 7, the inclined walls 112A are substantially circular arc shape toward the inside of the flat cell 10B with a radius R substantially equal to the thickness of the flat cell 10B. In addition to the operational effects of the aforementioned second embodiment, each of the inclined walls 112A of the upper sheath member 106B has a curved shape, and accordingly, redundant part of the laminate material of the upper sheath member 106B is reduced. Therefore, when the flat cell is evacuated, wrinkle in the step portions 111 is further suppressed. The radius R of the curved shape of each inclined wall of the sheath member is not limited to the aforementioned radius in the present invention. A smaller radius has a larger effect on suppressing wrinkle, and, preferably, the radius of the curved shape is substantially the same as the thickness of the flat cell.

Hereinafter, a description is given of a battery formed by combining a plurality of the flat cells according to the aforementioned first embodiment and of a combined battery formed by combining a plurality of the batteries.

First, a description is given of two types of structures to electrically connect two flat cells 10, the structures giving resistance to external forces applied by vibration from the outside and the like.

Figure 8A:
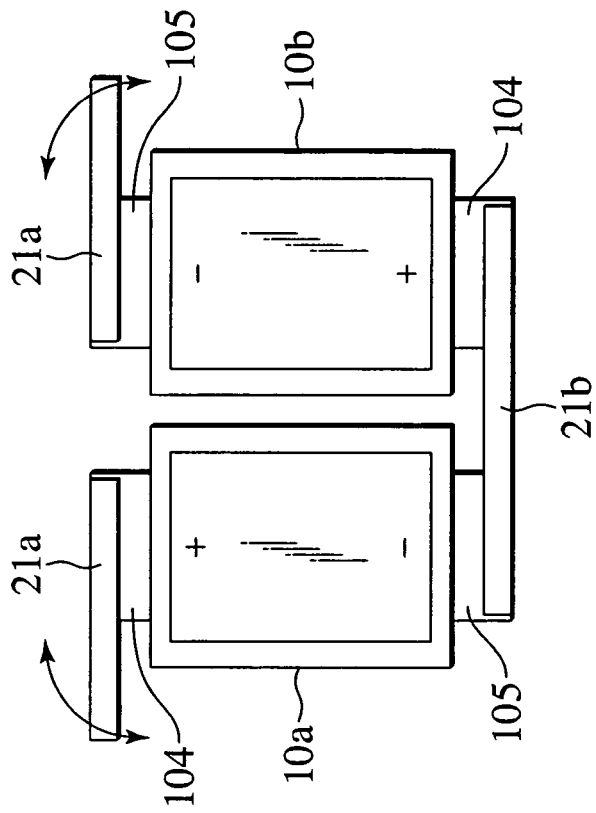
FIGS. 8A and 8B are views showing structures of connecting a plurality of the flat cells according to the first embodiment of the present invention.

As shown in FIG. 8A, in the first connecting structure giving resistance to external forces, a first flat cell 10a and a second flat cell 10b are arranged side by side on a same plane so that the positive terminal 104 of the first flat cell 10a and the positive terminal 104 of the second flat cell 10b are directed in a same direction. The positive terminal 104 of the first flat cell 10a and the positive terminal 104 of the second flat cell 10b are electrically connected to each other through a first bus bar 21a. The negative terminal 105 of the first flat cell 10a and the negative terminal 105 of the second flat cell 10b are electrically connected to each other through a second bus bar 21b. As described above, the terminals with a same polarity of the two flat cells are connected through the bus bars to form a link structure. External forces by vibration from the outside and the like are thereby applied to the flat cells at a same phase, and therefore, such a structure is resistant to torsion caused in each flat cell.

Figure 8B:
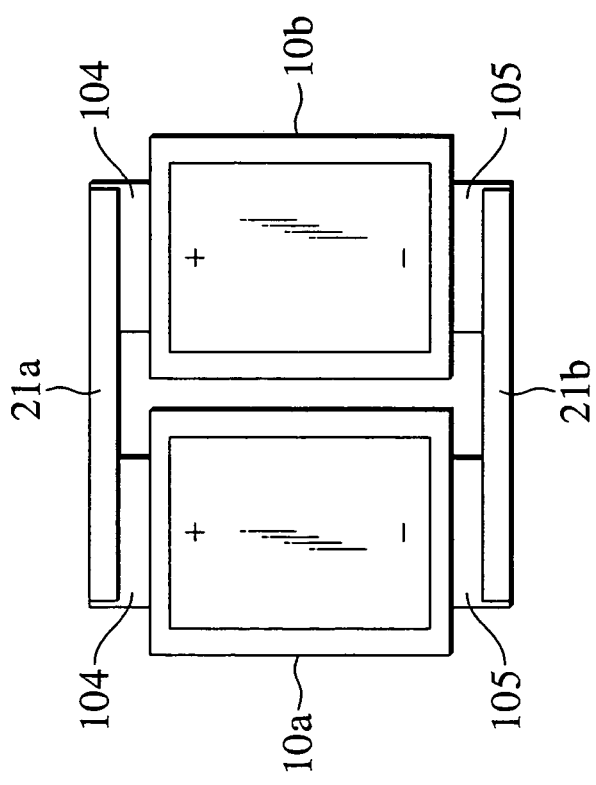

On the contrary, as shown in FIG. 8B, the first flat cell 10a and the second flat cell 10b are arranged side by side on a same plane so that the positive terminals 104 of the first and second flat cells 10a and 10b are directed in opposite directions. The positive terminal 104 of the first flat cell 10a and the negative terminal 105 of the second flat cell 10b are not electrically connected, and the negative terminal 105 of the first flat cell 10a and the positive terminal 104 of the second flat cell 10b are electrically connected through the second bus bar 21b, thus connecting the first and second flat cells 10a and 10b in series. When the terminals with different polarities of the two flat cells are connected to each other through the bus bars to form a non-link structure as described above, external forces by vibration from the outside and the like are applied to each flat cell independently, and therefore, such a structure is less resistant to torsion than the aforementioned case of parallel connection.

Figure 9A:
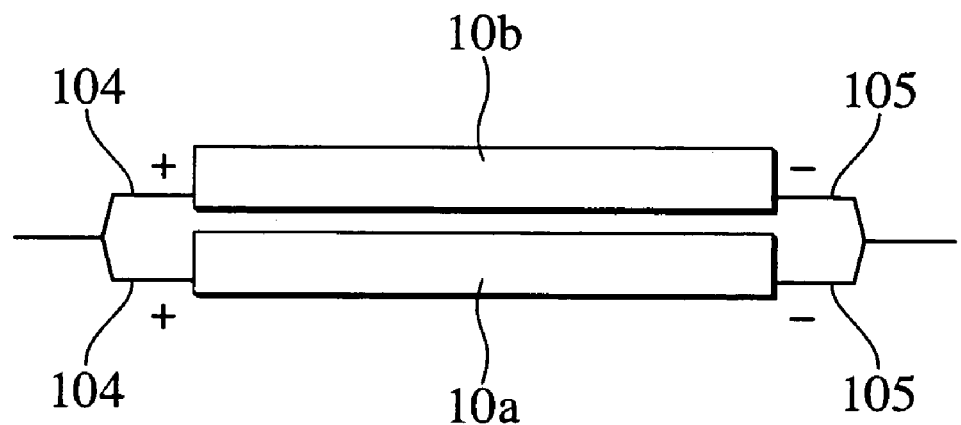
FIGS. 9A and 9B are views showing other structures of connecting the plurality of flat cells according to the first embodiment of the present invention.

In the second connecting structure, as shown in FIG. 9A, the second flat cell 10b is stacked on the first flat cell 10a so that the positive terminal 104 of the first flat cell 10a and the positive terminal 104 of the second flat cell 10b are directed in a same direction. The positive terminal 104 of the first flat cell 10a and the positive terminal 104 of the second flat cell 10b are welded to be electrically connected to each other. In the same manner, the negative terminal 105 of the first flat cell 10a and the negative terminal 105 of the second flat cell 10b are welded to be electrically connected to each other. As described above, the terminals with a same polarity of two flat cells are connected to form a link structure. External forces by vibrations from the outside and the like are therefore applied to each flat cell at a same phase, and such a structure is resistant to torsion caused in each flat cell.

Figure 9B:
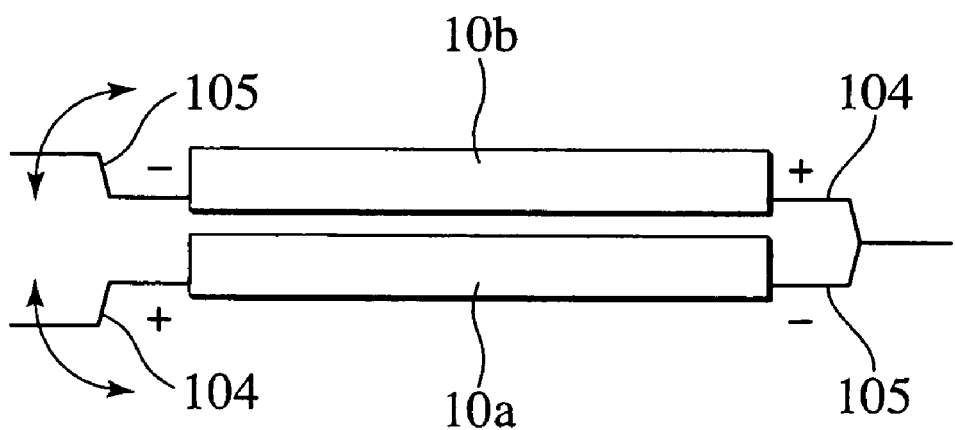

On the contrary, as shown in FIG. 9B, the second flat cell 10*b* is stacked on the first flat cell 10*a* so that the positive terminal 104 of the first flat cell 10*a* and the positive terminal 104 of the second flat cell 10*b* are directed in opposite directions. The positive terminal 104 of the first flat cell 10*a* and the negative terminal 105 of the second flat cell 10*b* are not electrically connected, and the negative terminal 105 of the first flat cell 10*a* and the positive terminal 104 of the second flat cell 10*b* are welded to be electrically connected to each other. When the terminals with different polarities of two flat cells are connected to each other into a non-link structure as described above, external forces by vibrations from the outside and the like are applied to each flat cell independently, and therefore, such a structure is less resistant to torsion than the aforementioned case of parallel connection.

Figure 10A:
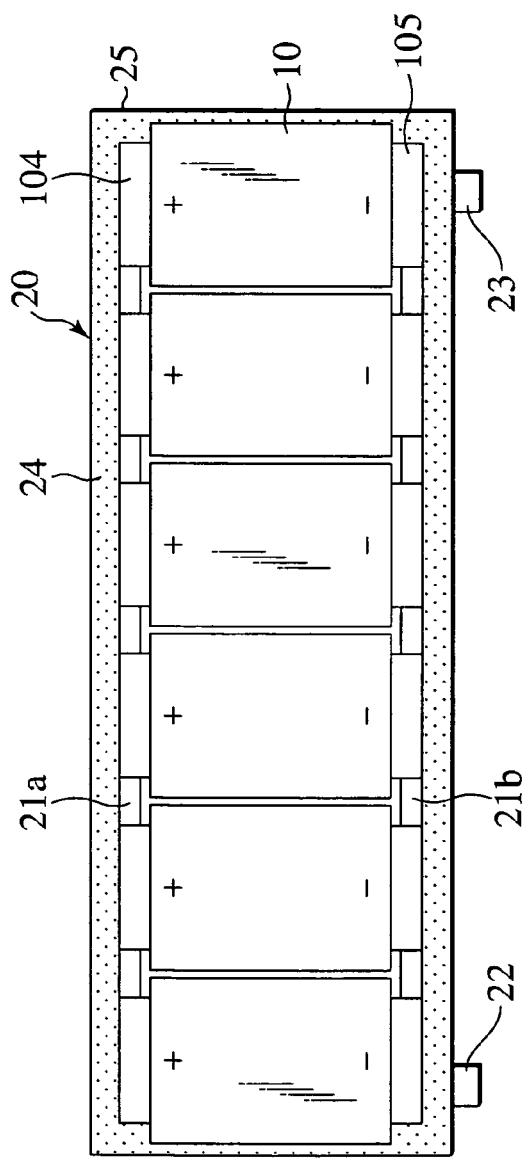
FIG. 10A is a plan view showing a battery composed of the plurality of flat cells according to the first embodiment of the present invention.
Figure 10C:
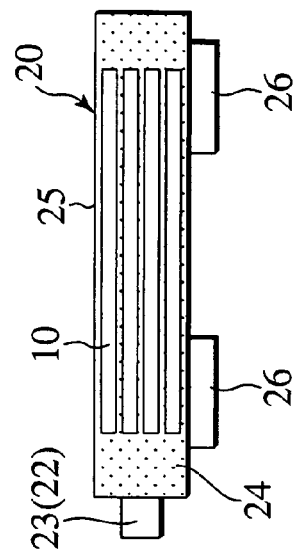
FIG. 10C is a side view showing the battery composed of the plurality of flat cells according to the first embodiment of the present invention.
Figure 10B:
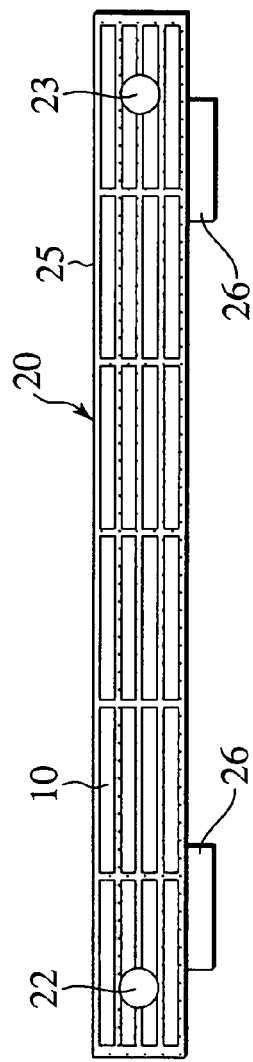
FIG. 10B is a front view showing the battery composed of the plurality of flat cells according to the first embodiment of the present invention.

FIGS. 10A to 10C show a battery 20 composed of twenty-four of the flat cells 10 connected in parallel by use of the aforementioned connecting structure. This battery 20 includes twenty-four flat cells 10, battery terminals 22 and 23, and a battery cover 25. Particularly not shown in the drawing, terminals with a same polarity of the flat cells 10 are connected through the bus bars 21*a* and 21*b* according to the aforementioned connecting structure, and the flat cells are connected in parallel. The first bus bar 21*a* connecting the positive terminals 104 is connected to the battery positive terminal 22 which is substantially cylindrical and extends out from the battery cover 25. Similarly, the second bus bar 21*b* connecting the negative terminals 105 is connected to the battery negative terminal 23, which is substantially cylindrical and extends out from the battery cover 25. The twenty-four flat cells 10 thus connected are provided within the battery cover 25, and space defined between the cover 25 of the battery 20 and the other components of the battery 20 is filled with filler 24 and sealed. Furthermore, external elastic units 26 are attached to four corners in the lower surface of the battery cover 25 to reduce transmission of vibrations between batteries 20 when the batteries 20 are stacked as a later-described combined battery.

FIGS. 11A to 11C show a combined battery 30 composed of six of the batteries 20 shown in FIGS. 10A to 10C, the batteries 20 being electrically connected to each other. As shown in FIGS. 11A to 11C, in the combined battery 30, the batteries 20 are stacked so that the terminals 22 and 23 of the batteries 20 are directed in a same direction. Specifically, the battery 20 positioned in the (m+1)-th layer is stacked on the battery 20 positioned in the m-th layer so that the terminals 22 and 23 of the battery 20 in the (m+1)-th layer are directed to the same direction as the terminals 22 and 23 of the battery 20 in the m-th layer, respectively. Herein, m is a natural number. The battery positive terminals 22 of all the batteries 20, which are directed in the same direction, are electrically connected to each other through an external connection positive terminal 31 for connecting the combined battery 30 and the outside. Similarly, the battery negative terminals 23 of all the batteries 20, which are directed in the same direction, are electrically connected to each other through an external connection negative terminal 32. As shown in the drawing, the external connection positive terminal 31 has a substantially rectangular plate shape and is provided with a plurality of terminal connection holes. Each of the terminal connection holes is of such a diameter that each of the battery positive terminals 22 can be inserted therein. The terminal connection holes are processed at intervals substantially equal to intervals of the battery positive terminals 22 of the stacked batteries 20. The external connection negative terminal 32 is provided with similar terminal connection holes. The six batteries 20 stacked as described above are coupled to each other with plate-shaped coupling members 34 on both sides thereof and fastened to be fixed with fixing screws 35.

As described above, the battery is constructed on the basis of a predetermined number of the flat cells as a unit, and the combined battery is constructed on the basis of the batteries as a unit. Therefore, it is possible to easily obtain a combined battery suitable for required capacity, voltage, and the like.

Moreover, the combined battery can be constructed without complicated connections, and the failure rate of the combined battery due to insufficient connections or the like can be reduced.

Furthermore, when some of the flat cells constituting the combined batterys are broken or deteriorated and needs to be replaced, the combined battery can be easily repaired by replacing only a battery including that broken or deteriorated flat cells.

Figure 12:
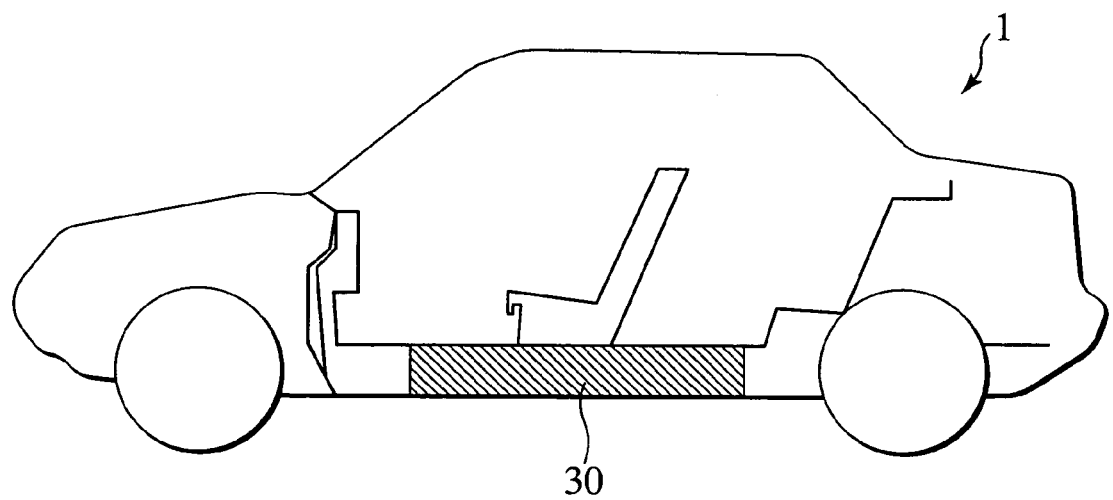
FIG. 12 is a schematic view showing a vehicle on which the combined battery according to the present invention is mounted.

FIG. 12 shows an example of a vehicle 1 such as an electric vehicle with the aforementioned combined battery 30 mounted under a floor thereof. The flat cell for use in vehicles, which has electrode plates with large surfaces, is more likely to vary in degradation distributions of the positive and negative electrode active materials. Therefore, use of the combined battery 30 using the flat cells according to the embodiments with equalized degradation distributions is effective especially for the vehicle 1.

As described above, in each of the flat cells according to the first to third embodiments, first, the flat wall is previously molded in the portion accommodating the power-generating member in the sheath member of the flat cell, and when the cell is evacuated, the electrode plates are uniformly pressurized with this wide flat wall. Therefore, the degradation distributions of the electrode active materials depending on the distribution of surface pressure are not varied, and the degradation distribution can be equalized. Secondly, the inclined walls are previously molded between the flat wall and the outer periphery of the sheath member, and when the cell is evacuated, the sheath member is deformed so as to follow the collectors to form smooth step portions. Therefore, wrinkle in the step portions is suppressed, and the strength of the sheath member can be maintained. Moreover, in the flat cell according to the embodiments, along with equalization of the surface pressure distribution due to the flat wall of the upper sheath member, the surface pressure applied to the entire power-generating element is increased. The intervals between the electrode plates are thereby narrowed overall, and the impedance is reduced. Therefore, the capacity provided for the flat cell can be sufficiently exerted.

In the flat cell according to the second and third embodiments of the present invention, at least a corner portion including a part substantially vertical to the upper surface of the power-generating element is previously molded at a position corresponding to at least a corner of the power-generating element. When the cell is evacuated, pressure applied to the outer periphery of the power-generating element from the sheath member is thereby reduced. The variation in intervals between the electrode plates is reduced, and the distribution of the surface pressure applied to the power-generating element can be equalized. Moreover, the length of the vertical part of the corner portion is set larger than, at least, the total thickness of a positive plate, a separator, and a negative plate. Therefore, the distribution of the surface pressure applied to the power-generating element from the sheath member can be further equalized.

Furthermore, in the flat cell according to the third embodiment, each of the inclined walls of the sheath member has a curved shape, and redundant part of the laminate material of resin-metal thin film is reduced. Therefore, it is possible to further suppress wrinkle in the sheath member when the inside of the cell is evacuated.

The aforementioned embodiments are described to facilitate understanding of the present invention but not described to limit the present invention. Accordingly, each component disclosed in the aforementioned embodiment intends to involve all design variations and equivalents belonging to the technical scope of the present invention. For example, the number of flat cells constituting the battery, the number of batteries constituting the combined battery, the method of connecting the flat cells constituting the battery, and the method of connecting the batteries constituting the combined battery are not limited to the aforementioned numbers and connecting methods. The numbers thereof and the connecting methods (series connection, parallel connection, or series and parallel mixed connection) can be properly set depending on required electric capacity, voltage, and the like.

In the aforementioned embodiments, the description has been given of the battery, the combined battery, and the vehicle including the flat cells according to the first embodiment, but the battery, the combined battery, and the vehicle can include the flat cells according to the second or third embodiment.

Hereinafter, a description is given of examples giving concrete forms to the present invention.

EXAMPLE 1

A flat cell of Example 1 was prepared as follows. In the flat cell of Example 1, the positive terminal, the negative terminal, the positive electrode active material, and the negative electrode active material were an aluminum foil with a thickness of 100 μm, a copper foil with a thickness of 100 μm, a lithium-manganese composite oxide, and a crystalline carbon material, respectively. As the upper sheath member, only the flat wall and the inclined walls as shown in FIG. 4 of the first embodiment were molded in a laminate material of resin-metal thin film. The angle θ of the inclined walls of the upper sheath member was 60° with respect to the surfaces of the electrode terminals. The fabricating conditions of the flat cell fabricated in Example 1 are shown in Table 1.

TABLE 1

|  | θ (°) | Corner Portion | L (mm) | Curved shape |
| --- | --- | --- | --- | --- |
| Example 1 | 60 | Not provided | — | Not curved |
| Example 2 | 80 | Not provided | — | Not curved |
| Example 3 | 45 | Not provided | — | Not curved |
| Example 4 | 80 | provided | 0.3 | Not curved |
| Example 5 | 80 | provided | 0.9 | Not curved |
| Example 6 | 80 | provided | 0.9 | Curved |
| Comparative Example 1 | — | Not provided | — | Not curved |
| Comparative Example 2 | — | Not provided | — | Not curved |

This flat cell was measured in terms of an amount of wrinkles caused in the step portions of the upper sheath member, the surface pressure distribution in the power-generating element, and the rate of increase of surface pressure. The measurement of the amount of wrinkles of the upper sheath member was performed by visual observation of the step portions of the sheath member after the cell was evacuated. The measurement of the surface pressure distribution in the power-generating element was performed as follows. Thicknesses of the evacuated flat cell at nine positions ((upper portion, middle portion, lower portion)×(right, center, left)) in the surface were measured with a micrometer in detail. The measured thicknesses at the above positions were converted into surface pressures based on a surface pressure-thickness master curve, which was created by measuring changes in thickness when load is applied to a cell composed of the same materials as those of Examples. The rate of increase of surface pressure was measured by comparing a representative surface pressure of the flat cell with that of Comparative Example 1 and calculating a rate of increase of surface pressure. Herein, the representative surface pressure is an average value of surface pressures at the above nine positions.

As a result, in the measurement of the amount of wrinkles caused in Example 1, as shown in Table 2, the amount of wrinkles in the step portions of the upper sheath member of Example 1 was drastically reduced compared to that of the flat cell of Comparative Example 1. The surface pressure distribution in Example 1 was almost equalized with few variations, and the surface pressure was increased by about 13% as a whole.

TABLE 2

|  | Amount of wrinkles | Surface pressure distribution | Rate of increase of surface pressure (%) |
| --- | --- | --- | --- |
| Example 1 | B | Y | 13 |
| Example 2 | B | Y | 15 |
| Example 3 | B | Y | 10 |
| Example 4 | B | Y | 20 |
| Example 5 | A | Y | 23 |
| Example 6 | A | Y | 30 |
| Comparative Example 1 | C | N | — |
| Comparative Example 2 | C | N | — |

In Table 2, in terms of the amount of wrinkles, "A" indicates that few wrinkles were caused; "B" indicates that a few amount of wrinkles were caused; and "C" indicates that a large amount of wrinkles were caused. In terms of the surface pressure distribution, "Y" indicates that there is little variation in the surface pressure distribution, and "N" indicates that there is wide variation in the surface pressure distribution.

EXAMPLE 2

A flat cell of Example 2, as shown in Table 1, was prepared using the positive and negative electrode active materials and the positive and negative terminals the same as those of Example 1. As the upper sheath member, only the flat wall and the inclined walls as shown in FIG. 4 of the first embodiment were molded in the laminate material of resin-metal thin film. The angle θ of the inclined walls of the upper sheath member was 80° with respect to the surface of the electrode terminal. The fabricating conditions of the flat cell fabricated in Example 2 are shown in Table 1.

This flat cell was measured in terms of the amount of wrinkles caused in the step portions of the upper sheath member, the surface pressure distribution of the power-generating element, and the rate of increase of surface pressure under the same conditions as those of Example 1. As a result, as shown in Table 2, in the measurement of the amount of wrinkles caused in Example 2, the amount of wrinkles in the step portions of the upper sheath member was drastically reduced compared to the flat cell of Comparative Example 1. The surface pressure distribution in Example 2 was almost equalized with little variation, and the surface pressure was increased by about 15% as a whole.

EXAMPLE 3

A flat cell of Example 3, as shown in Table 1, was prepared using the positive and negative electrode active materials and the positive and negative terminals the same as those of Example 1. As the upper sheath member, only the flat wall and the inclined walls as shown in FIG. 4 of the first embodiment were molded in the laminate material of resin-metal thin film. The angle θ of the inclined walls of the upper sheath member was 45° with respect to the surface of the electrode terminal. The fabricating conditions of the flat cell fabricated in Example 3 are shown in Table 1.

This flat cell was measured in terms of the amount of wrinkles caused in the step portions of the upper sheath member, the surface pressure distribution of the power-generating element, and the rate of increase of surface pressure under the same conditions as those of Example 1. As a result, as shown in Table 2, in the measurement of the amount of wrinkles caused in Example 3, the amount of wrinkles in the step portions of the upper sheath member was drastically reduced compared to the flat cell of Comparative Example 1. The surface pressure distribution in Example 3 was almost equalized with little variation, and the surface pressure was increased by about 10% as a whole.

EXAMPLE 4

A flat cell of Example 4, as shown in Table 1, was prepared using the positive and negative electrode active materials and the positive and negative terminals the same as those of Example 1. As the upper sheath member, the flat wall, the inclined walls, and the corner portions at four corners of the flat wall, as shown in FIG. 6 of the second embodiment, were molded in the laminate material of resin-metal thin film. The angle θ of the inclined walls of the upper sheath member was 80° with respect to the surface of the electrode terminal. The length L of the vertical part of each corner portion was set to about 0.3 mm corresponding to the total thickness of one positive plate, one separator, and one negative plate. The fabricating conditions of the flat cell fabricated in Example 4 are shown in Table 1.

This flat cell was measured in terms of the amount of wrinkles caused in the step portions of the upper sheath member, the surface pressure distribution of the power-generating element, and the rate of increase of surface pressure under the same conditions as those of Example 1. As a result, as shown in Table 2, in the measurement of the amount of wrinkles caused in Example 4, the amount of wrinkles in the step portions of the upper sheath member was drastically reduced compared to that of the flat cell of Comparative Example 1. The surface pressure distribution in Example 4 was almost equalized with little variation, and the surface pressure was increased by about 20% as a whole.

EXAMPLE 5

A flat cell of Example 5, as shown in Table 1, was prepared using the positive and negative electrode active materials and the positive and negative terminals the same as those of Example 1. As the upper sheath member, the flat wall, the inclined walls, and the corner portions at four corners of the flat wall, as shown in FIG. 6 of the second embodiment, were molded in the laminate material of resin-metal thin film. The angle θ of the inclined walls of the upper sheath member was 80° with respect to the surface of the electrode terminal. The length L of the vertical part of each corner portion was set to about 0.9 mm corresponding to the total thickness of three positive plates, three separators, and three negative plates. The fabricating conditions of the flat cell fabricated in Example 5 are shown in Table 1.

This flat cell was measured in terms of the amount of wrinkles caused in the step portions of the upper sheath member, the surface pressure distribution of the power-generating element, and the rate of increase of the surface pressure under the same conditions as those of Example 1. As a result, as shown in Table 2, in the measurement of the amount of wrinkles caused in Example 5, the amount of wrinkles in the step portions of the upper sheath member was drastically reduced compared to that of the flat cell of Comparative Example 1. The surface pressure distribution in Example 5 was almost equalized with little variation, and the surface pressure was increased by about 23% as a whole.

EXAMPLE 6

A flat cell of Example 6, as shown in Table 1, was prepared using the positive and negative electrode active materials and the positive and negative terminals the same as those of Example 1. As the upper sheath member, the flat wall, the inclined walls with curved shapes, and the corner portions at four corners of the flat wall, as shown in FIG. 7 of the third embodiment, were molded in the laminate material of resin-metal thin film. The curved shape of each of the inclined walls of the upper sheath member was an arc with a radius corresponding to the total thickness of the power-generating element of 4 mm. The length L of the vertical part of each corner portion was set to about 0.9 mm corresponding to the total thickness of three positive plates, three separators, and three negative plates. The fabricating conditions of the flat cell fabricated in Example 6 are shown in Table 1.

This flat cell was measured in terms of the amount of wrinkles caused in the step portions of the upper sheath member, the surface pressure distribution of the power-generating element, and the rate of increase of surface pressure under the same conditions as those of Example 1. As a result, as shown in Table 2, in the measurement of the amount of wrinkles caused in Example 6, the amount of wrinkles in the step portions of the upper sheath member was drastically reduced compared to that of the flat cell of Comparative Example 1. The surface pressure distribution in Example 6 was almost equalized with little variation, and the surface pressure was increased by about 30% as a whole.

COMPARATIVE EXAMPLE 1

The flat cell of Comparative Example 1, as shown in Table 1, was prepared using the positive and negative electrode active materials and the positive and negative terminals the same as those of Example 1. As the upper sheath member, the laminate material of resin-metal thin film was molded into a simple convex shape composed of a flat wall and step portions vertical to the flat wall as shown in FIG. 1A. The fabricating conditions of the flat cell fabricated in Comparative Example 1 are shown in Table 1.

This flat cell was measured in terms of the amount of wrinkles caused in the step portions of the upper sheath member and the surface pressure distribution of the power-generating element under the same conditions as those of Example 1. As a result, as shown in Table 2, a large amount of wrinkles were caused in the step portions of the upper sheath member, and the surface pressure distribution of the power-generating element was varied.

COMPARATIVE EXAMPLE 2

A flat cell of Comparative Example 2, as shown in Table 1, was prepared using the positive and negative electrode active materials and the positive and negative terminals the same as those of Example 1, and using, as the upper sheath member, a resin-metal thin laminate sheet with no flat walls, no inclined walls and no corner portions. The fabricating conditions of the flat cell fabricated in Comparative Example 2 are shown in Table 1.

This flat cell was measured in terms of the amount of wrinkles caused in the step portions of the upper sheath member and the surface pressure distribution of the power-generating element under the same conditions as those of Example 1. As a result, as shown in Table 2, a large amount of wrinkles were caused in the step portions of the upper sheath member. The surface pressure of the power-generating element was small in the center part of the cell and large in the outer periphery thereof, and the surface pressure distribution was widely varied.

Comparing Examples 1 to 6 with Comparative Examples 1 and 2, it was confirmed that previously molding the inclined walls in the step portions of the upper sheath member significantly suppressed wrinkle in the step portions, equalized the surface pressure distribution in the power-generating element, and furthermore, increased the surface pressure in the power-generating element.

Comparing Examples 1 to 4 with Examples 5 and 6, it was confirmed that previously molding the corner portions, each having the vertical part with the proper length L, in the upper sheath member extremely reduced wrinkles caused in the step portions.

Furthermore, it was confirmed that the factors increasing the surface pressure in the power-generating element were as follows: a larger angle θ (by comparison of Examples 1 to 3); the corner portions formed in the upper sheath member (by comparison of Examples 2 and 4); a longer vertical part of each corner portion (by comparison of Examples 4 and 5); and the curved shape of the inclined walls molded in the upper sheath member (by comparison of Examples 5 and 6).

The entire content of a Japanese Patent Application No. P2003-352748 with a filing date of Oct. 10, 2003 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A flat cell, comprising:
a power-generating element which includes a positive plate, a negative plate, and a separator provided between the positive and negative plates;
a sheath member, the sheath member including an upper sheath member and a lower sheath member, wherein the sheath member envelopes the power-generating element, the upper sheath member including a flat wall in a portion parallel to a long axis of the power-generating element and an inclined wall extending generally away from the flat wall generally towards an outer periphery of the sheath member; and
positive and negative terminals connected to the power-generating element through a plurality of collectors and extended from the outer periphery of the sheath member, wherein a first internal pressure inside the sheath member is present due to evacuation inside the sheath member, the first internal pressure being sufficient to force the inclined wall to be continuously smoothly convexly curved relative to an inside of the cell as opposed to a relaxed state of the inclined wall which is a state in which the inclined wall extends substantially linearly at an oblique angle relative to a surface of one of the terminals.

2. A flat cell according to claim 1,
wherein the positive and negative terminals each have a planar shape, and
before an inside of the cell is evacuated due to evacuation to vacuum inside the sheath member, the inclined wall is inclined at an angle of 45° to 80° with respect to the surface of one of the terminals.

3. A flat cell according to claim 1,
wherein the upper sheath member includes a corner portion having a part substantially vertical to the flat wall, the corner portion being molded in a position corresponding to at least a corner of the power-generating element.

4. A flat cell according to claim 3,
wherein a length of the vertical part included in the corner portion is larger than a total thickness of the positive plate, the negative plate, and the separator.

5. A flat cell according to claim 1,
wherein before an inside of the cell is subjected to evacuation to vacuum, the inclined wall is molded substantially in parallel to a collector which is positioned closest to the sheath member among the plurality of collectors.

6. A flat cell according to claim 1,
wherein the positive terminal contains at least one of aluminum, iron, copper, and nickel.

7. A flat cell according to claim 1,
wherein the sheath member contains at least one of polypropylene, modified polypropylene, polyethylene, modified polyethylene, and ionomer.

8. A flat cell according to claim 1,
wherein the positive plate contains a positive electrode active material and the positive electrode active material is a lithium-based composite oxide.

9. A flat cell according to claim 8,
wherein the lithium-based composite oxide is a lithium-manganese-based composite oxide.

10. A flat cell according to claim 1,
wherein the negative plate contains a negative electrode active material and the negative electrode active material is a carbon material.

11. A flat cell according to claim 10,
wherein the carbon material is one of a crystalline carbon material and an amorphous carbon material.

12. A flat cell according to claim 1,
wherein the relaxed state of the inclined wall is such that the inclined wall is inclined at an angle of 45° to 80° with respect to the surface of one of the terminals.

13. A flat cell according to claim 1,
wherein the first internal pressure is distinguished from a second internal pressure due to non-evacuation inside the sheath member, the second internal pressure being such that when exposed to the second internal pressure, the inclined wall forms a linearly extending wall which is at an oblique angle relative to a direction of extension away from the sheath member of one of the terminals.

14. A flat cell according to claim 13,
wherein the second internal pressure is such that when exposed to the second internal pressure, the inclined wall is inclined at an angle of 45° to 80° with respect to the surface of one of the terminals.

15. A flat cell according to claim 1,
wherein the inclined wall extends from an upper portion of the flat cell to the lower sheath member.

16. A flat cell according to claim 1,
wherein evacuation inside the sheath member forms a vacuum.

17. A flat cell according to claim 1,
wherein the first internal pressure forces the inclined wall to extend in a continuous curve from an upper portion of the flat cell to the lower sheath member.

18. A flat cell according to claim 1,
wherein the inclined wall extends in a smoothly curved manner without wrinkles and without folds.

19. A flat cell according to claim 1,
wherein evacuation inside the sheath member is a vacuum.

20. A battery, comprising:
a plurality of flat cells,
the flat cells, comprising:
   a power-generating element which includes a positive plate, a negative plate, and a separator provided between the positive and negative plates;
   a sheath member, the sheath member including
   an upper sheath member and a lower sheath member, wherein the sheath member envelopes the power-generating element, the upper sheath member including a flat wall in a portion parallel to a long axis of the power-generating element and an inclined wall extending generally away from the flat wall generally towards an outer periphery of the sheath member; and
   positive and negative terminals connected to the power-generating element through a plurality of collectors and extended from the outer periphery of the sheath member,
   wherein an inside of each of the cells is evacuated, the evacuation being sufficient to apply a force on the inclined wall to force the inclined wall to be convexly smoothly curved relative to the inside of the respective cell due to the evacuation.

21. A battery according to claim 20,
wherein the flat cells are stacked on one another with respective positive terminals of respective flat cells being directed in a substantially same direction as each other, and wherein respective terminals with same polarities of respective flat cells are electrically connected to each other to form the battery.

22. A battery according to claim 20,
wherein the flat cells are arranged beside one another with respective positive terminals of respective flat cells being directed in a substantially same direction as each other, and wherein respective terminals with same polarities of respective flat cells are electrically connected to each other through connecting members to form the battery.

23. A battery combination; comprising:
a plurality of batteries according to claim 20, wherein the plurality of batteries are connected to one another.

24. A vehicle, comprising:
a battery according to claim 20, and
a vehicle body, wherein the battery is mounted on the vehicle.

25. A battery according to claim 20,
wherein the convexly curved state of the inclined wall is distinguished from a relaxed state of the inclined wall where the inclined wall extends substantially linearly at an oblique angle relative to a surface of one of the terminals.

26. A battery according to claim 25,
wherein the relaxed state of the inclined wall is such that the inclined wall is inclined at an angle of 45° to 80° with respect to the surface of one of the terminals.

27. A battery according to claim 20,
wherein the inclined wall extends from an upper portion of the flat cell to the lower sheath member.

28. A battery according to claim 20,
wherein the inclined wall extends in a smoothly curved manner without wrinkles and without folds.

* * * * *